United States Patent [19]

Ozawa

[11] Patent Number: 4,949,121
[45] Date of Patent: Aug. 14, 1990

[54] PHOTOGRAPHIC PAPER MAGAZINE

[75] Inventor: Yoshio Ozawa, Kanagawa, Japan

[73] Assignee: Fuji Photo Film Co., Ltd., Kanagawa, Japan

[21] Appl. No.: 256,358

[22] Filed: Oct. 11, 1988

[30] Foreign Application Priority Data

Oct. 9, 1987 [JP] Japan .............................. 62-154815[U]

[51] Int. Cl.[5] ............................................. G03B 27/58
[52] U.S. Cl. ....................................................... 355/72
[58] Field of Search ........................................... 355/72

[56] References Cited

U.S. PATENT DOCUMENTS

4,566,785 1/1986 Takenouchi ........................... 355/72

Primary Examiner—Donald Griffin
Attorney, Agent, or Firm—Sughrue, Mion, Zinn, Macpeak & Seas

[57] ABSTRACT

A photographic paper magazine in which a detection apparatus faces photographic paper which is unrolled from a roll axially supported by a support member on a magazine body and which is supplied to an outlet. If no photographic paper is detected, the checking apparatus checks the photographic paper winding-up rotation of the support member so as to enable the photographic paper to be drawn out again. When the magazine is opened, the release apparatus cancels checking of the checking apparatus and allows the support member to rotate. The checking apparatus controls the rotation of the support member instead of controlling an intermediate portion of the photographic paper, thereby avoiding application of a substantial resistance to the photographic paper during the drawing-out operation.

20 Claims, 5 Drawing Sheets

PHOTOGRAPHIC PAPER MAGAZINE

BACKGROUND OF THE INVENTION

1. Field of the Invention

This invention relates to a photographic paper magazine for supplying a photographic printing apparatus with photographic paper.

2. Description of the Related Art

An arrangement for supplying a photographic printing apparatus with photographic paper is known in which a roll of photographic paper is unrolled at its outer periphery and is supplied to the photographic printing apparatus.

In this arrangement, the photographic paper is accommodated in a magazine which is to be set in the photographic printing apparatus. The photographic paper is continuously unrolled at the outer periphery of the roll, is drawn out of the magazine, and is supplied to the photographic printing apparatus.

Since it is necessary for the photographic printing apparatus to select the type of photographic paper with respect to the width thereof, there is a need to accommodate rolls of photographic paper having different widths in different magazines, and selectively use these magazines in accordance with the need. To change the width of the photographic paper to be used, the used magazine is taken out of the printing apparatus. If, in this case, an end of the roll of photographic paper is exposed outside the magazine, this exposed portion is fogged and becomes unusable when the magazine is taken out.

For this reason, it is convenient to design the magazine in such a manner that a photographic paper transfer roller is provided between the roll of photographic paper and the outlet of the magazine through which the photographic paper is taken out, and that this roller is manually driven so as to draw back the end of the roll of photographic paper into the magazine before the magazine is taken out of the printing apparatus.

Correspondingly, a type of magazine has been proposed in which pinch rollers are provided in a photographic paper drawing-out section, and these rollers are arranged to be rotated from the outside so as to draw back the end of the roll of photographic paper into the magazine at the time of replacement of photographic paper, and the transfer roller is stopped from rotating when the roll end is extracted to a predetermined extent (U.S. Pat. No. 4,566,785). If this magazine is opened to replace the photographic paper, the pinch-and-transfer rollers in the photographic paper drawing-out section are released from the rotation-locked state, thereby the roll of photographic paper is able to be replaced.

In this type of magazine, however, the pinch-and-transfer rollers act to increase the resistance to the force of drawing out the photographic paper after the magazine has been set in the photography printing apparatus since, during this operation, the pinch-and-transfer rollers keep pinching a drawn-out portion of the photographic paper. It is therefore necessary to provide a large photographic paper drawing force. In addition, the photographic paper tends to shift in the transversal direction because it is constantly pinched by the pinch rollers.

SUMMARY OF THE INVENTION

In view of these facts, it is an object of the present invention to provide a magazine in which the operation of drawing back the photographic paper can be stopped when the photographic paper is drawn back into the magazine to a predetermined extent to enable replacement of the photographic paper, and in which the movement of the photographic paper is not obstructed while the photographic paper is supplied to the photography printing apparatus.

To this end, the present invention provides a photographic paper magazine which comprises: a magazine body in which a roll of photographic paper is accommodated, the magazine body being capable of being closed and opened, a means for supporting the roll of photographic paper, axially supported on the magazine body; a photographic paper outlet aperture formed in the magazine body; a detection lever facing a photographic paper drawing-out section defined between the roll of photographic paper and the photographic paper outlet aperture, the detection lever being moved depending upon whether or not any portion of the photographic paper exists in the photographic paper drawing-out section; a checking means disposed between the detection lever and the photographic paper supporting means, the checking means checking photographic paper winding-up rotation of the photographic paper supporting means when no photographic paper exists in the photographic paper drawing-out section; and a release means for releasing the checking means from the checking state when the magazine is opened.

In accordance with the present invention, the photographic paper unrolled from the roll is supplied to the printing apparatus via the drawing-out section, and the checking means checks the rotation of the photographic paper supporting means in the photographic paper winding-up direction by detecting the state in which there is no photographic paper at a portion of the drawing-out section, after the photographic paper has been drawn back to a predetermined extent to enable the replacement of the magazine. The operator is thereby informed of the state in which the leading end of the photographic paper has been drawn back into the magazine to the predetermined extent.

When the magazine is opened to change the roll of photographic paper, the release means detects this opened state and releases the checking means from the checking state, thereby the photographic paper supporting means can be removed from the magazine body together with the roll of remaining photographic paper. Thereafter, a new roll of photographic paper can be loaded. This operation is performed in a darkroom in order to avoid exposure due to an inadvertent operation.

The new roll to be set in the magazine is attached to the photographic paper supporting means, and the drawn out leading end is placed in the photographic paper drawing-out section. Then, the checking means detects the existence of photographic paper in this drawing-out section, and allows the photographic paper supporting means to rotate and wind up the photographic paper. After the magazine has been set in the printing apparatus, the photographic paper is successively drawn out by its leading end and is supplied to the photography printing apparatus. At this time also, no substantial resistance to the drawing-out operation is produced in the photographic paper drawing-out section, thereby the photographic paper is easily lead to the photography printing apparatus by a driving force of this apparatus.

DESCRIPTION OF THE PREFERRED EMBODIMENT

Figure 1:
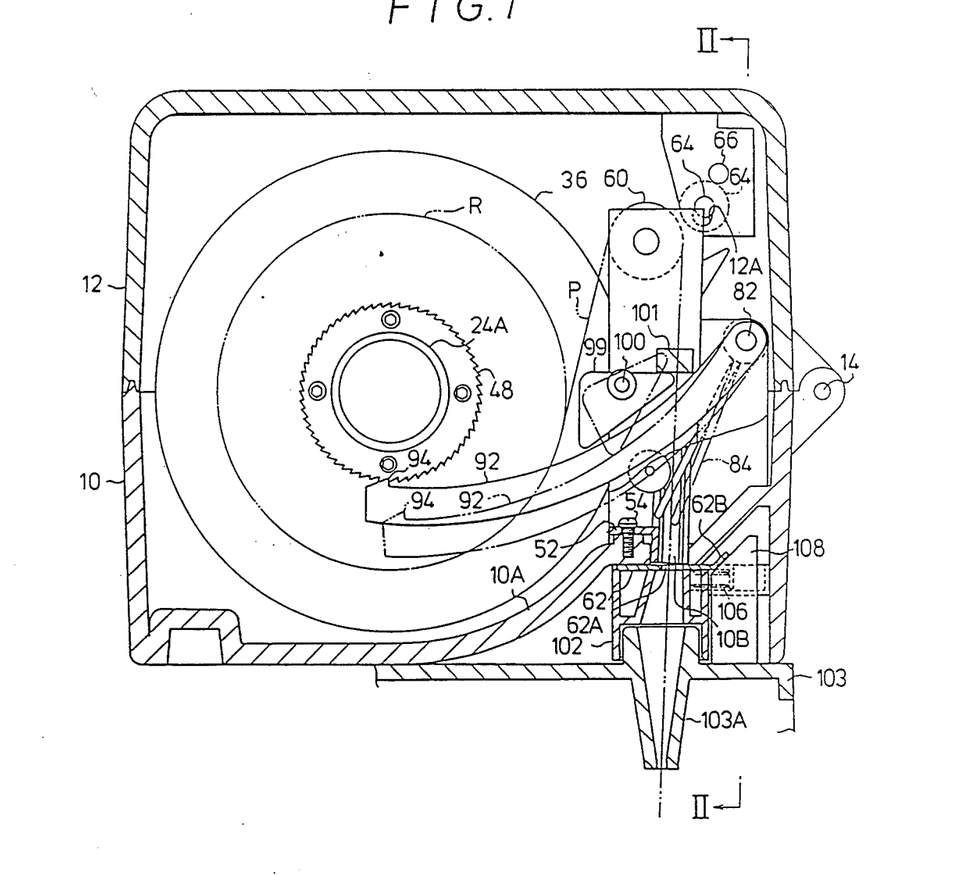
FIG. 1 is a cross-sectional view of a magazine of the present invention.
Figure 2:
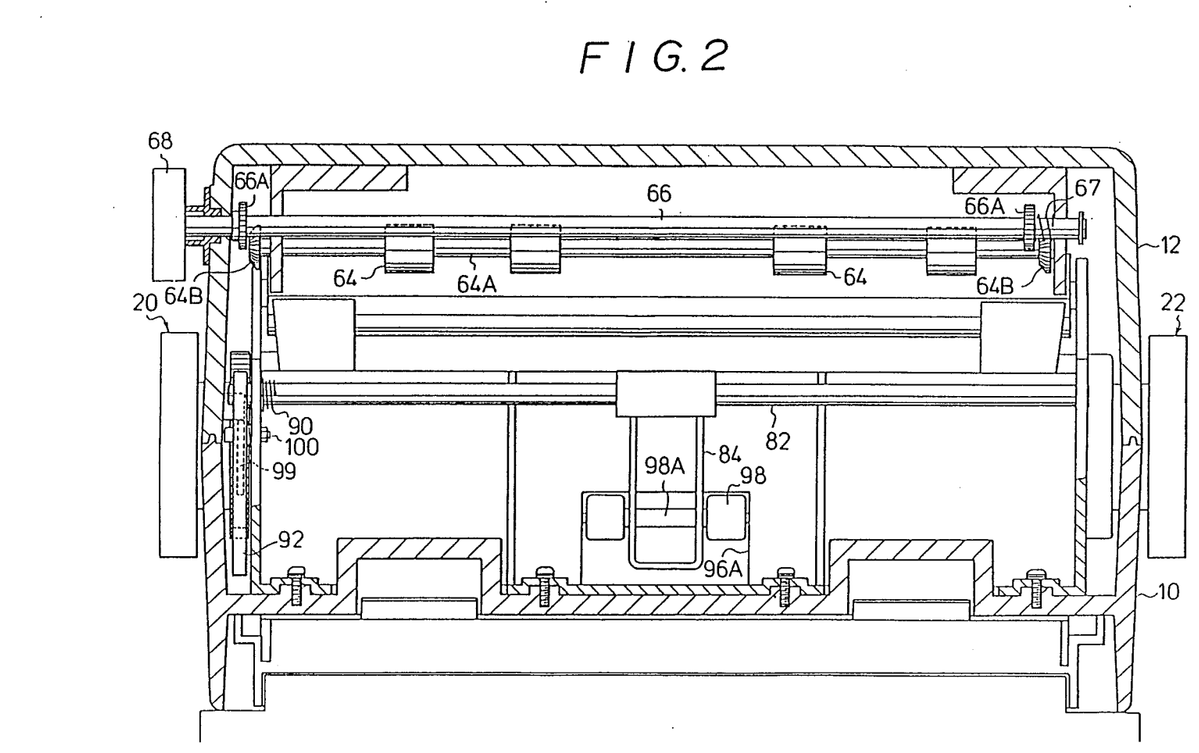
FIG. 2 is a cross-sectional view taken along the line II—II of FIG. 1.
Figure 3:
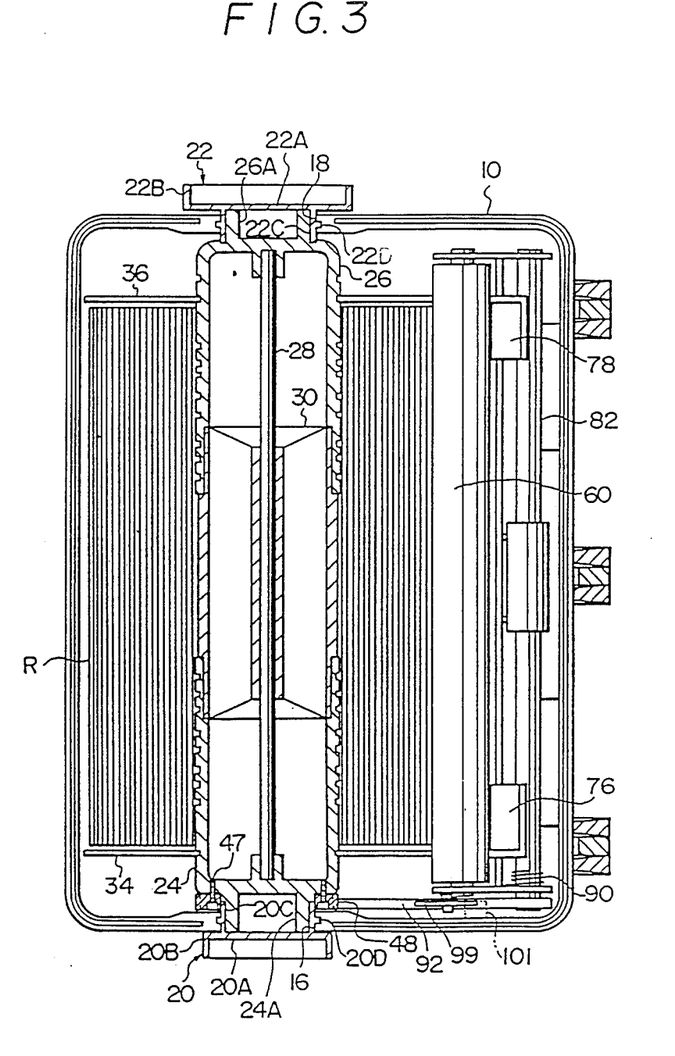
FIG. 3 is a plan view showing a state that an upper case of the magazine accommodating photographic paper is removed.

Referring to FIGS. 1 to 3, a magazine which represents an embodiment of the present invention has lower and upper cases 10 and 12 made of a synthetic resin which are connected to each other by a hinge 14 so that they are relatively rotatable. It is possible to shade the interior of the magazine by rotating the lower and upper cases 10 and 12 about the hinge 14 so as to make opening ends of these cases fitted to each other.

Semicircular recesses 16 and 18 are formed in the surface of the opening ends of the lower and upper cases 10 and 12 which are in close contact with each other when these cases are closed. The recesses 16 and 18 form circles when the lower and upper cases 10 and 12 are closed.

Rotary dial members 20 and 22 are accommodated in these recesses 16 and 18. The rotary dial members 20 and 22 are formed such that cylindrical portions 20B and 22B are integrally connected to outer peripheries of disk-like portions 20A and 22A; and tubular shafts 20C and 22C extend from the disk-like portions 20A and 22A oppositely relative to the cylindrical portions 20B and 22B. The outer peripheries of the tubular shafts 20C and 22C are slidable on inner peripheries of the recesses 16 and 18, and the rotary dial members 20 and 22 can therefore rotate about the shafts.

Ring-shaped projections 20D and 22D are arranged to project on axial-intermediate portions of the tubular shafts 20C and 22C. These projections are fitted in ring grooves formed in the recesses 16 and 18, thereby constituting a shading structure, whereby any external light is inhibited from entering the inside of the lower and upper cases 10 and 12 through the gaps between the recesses 16 and 18 and the tubular shafts 20C and 22C.

Figure 5:
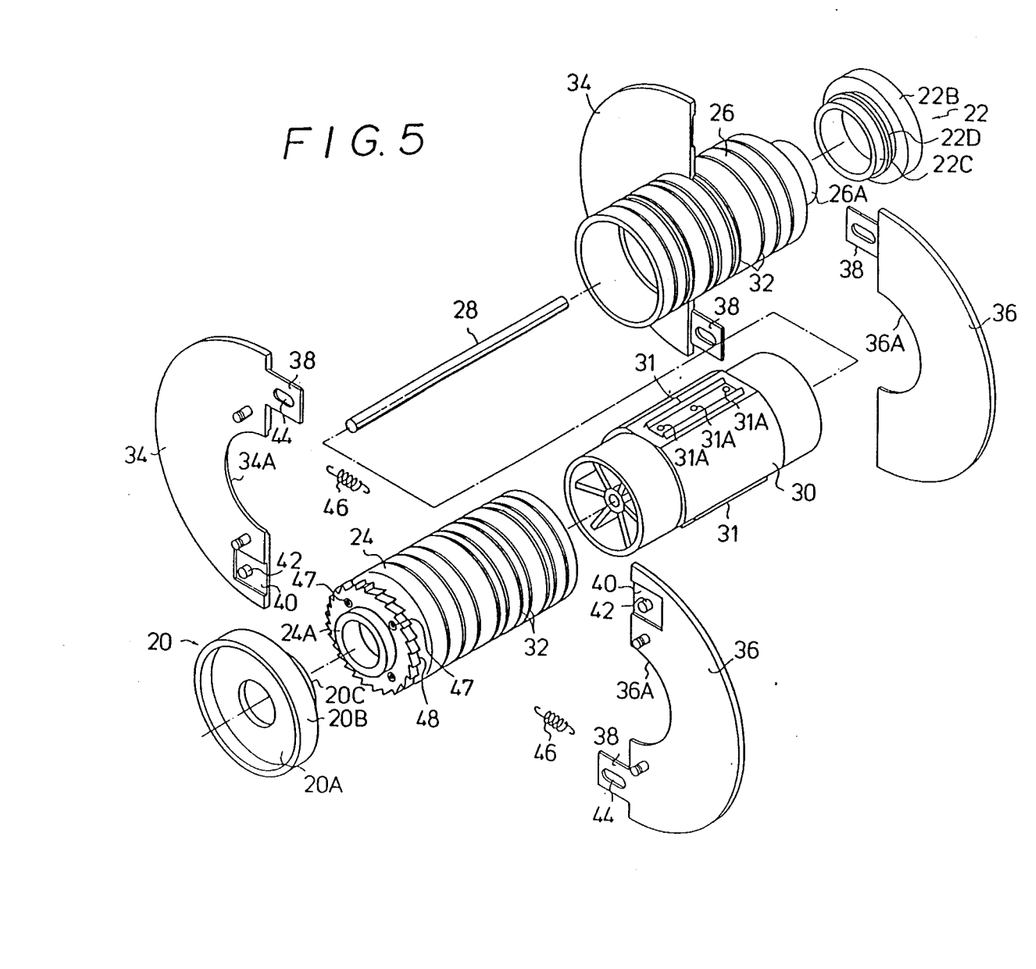
FIG. 5 is an exploded perspective view of spool members for supporting a roll of photographic paper.

Small tubular portions 24A and 26A which are formed on opposite ends of cylindrical-spools 24 and 26 which form a major part of a means for supporting a roll of photographic paper are inserted and fixed in the tubular shafts 20C and 22C. A support shaft 28 extends between the spools 24 and 26, and a support tube 30 is axially supported on an axial-intermediate portion of the support shaft 28. As shown in FIG. 5, a central portion of a plate spring 31 is fixed to the support tube 30 by vises 31A and is adapted to press an inner peripheral portion of the roll R of photographic paper P fitted around the outer peripheries of the spools 24 and 26.

A plurality of ring grooves 32 are formed in the outer peripheral surfaces of the spools 24 and 26, and pairs of partition plates 34 and 36 are fitted into the ring grooves 32. The partition plates 34 and 36 are semicircular and have inner semicircular cuts 34A and 36A which are formed coaxially with the partition plates 34 and 36 and the edges of which are inserted into the ring grooves 32.

Each pair of partition plates 34 and 36 form a disk when combined with each other. Each pair of partition plates 34 and 36 have pairs of mating surfaces. A projection 38 extends from one of each pair of mating surfaces, and a recess 40 for receiving the projection 38 is formed in the other mating surface. The projection 38 has an elongated hole in which a pin 42 which projects from the recess 40 is accommodated. It is therefore possible for the partition plates 34 and 36 in the assembled state to move away from each other to an extent defined by the clearance between the pin 42 and the elongated hole 44. The partition plates 34 and 36 are urged by a tension coil spring 46 stretched therebetween so that they become closer to each other.

Each pair of partition plates 34 and 36 are therefore brought into engagement with one of the ring grooves 32 by the urging force of the tension coil spring 46. If it is desired to change the width of the photographic paper P fitted around the spools 24 and 26, the partition plates 34 and 36 are moved in the axial direction of the spools and are set in different ones of the ring grooves 32. It is thus possible for the partition plates 34 and 36 to be attached to the spools 24 and 26 by being positioned in accordance with the widthwise opposite sides of the photographic paper P. The ring grooves are therefore formed in positions corresponding to different widths of photographic paper P.

As shown in FIGS. 3 and 5, a ratchet wheel 48 is fixed on a side surface of the cylindrical spool 24 by bolts 47. The ratchet wheel 48 constitutes a part of a checking means for checking the rotation of the cylindrical spools 24 and 26 in the direction of winding-up of the photographic paper.

As shown in FIG. 1, a part of bottom plate 10A of the lower case 10 is formed in parallel with the surface of the roll R of the photographic paper P, and support brackets 52 are fixed to a portion of the reset of the bottom plate 10A by vises 54. Side plates 56 and 58 upwardly extend parallel from the support brackets 52 while being suitable spaced apart from each other. Upper portions of the side plates 56 and 58 enter the upper case 12.

A winding roller 60 is supported on portions of the side plates 56 and 58 in the vicinity of upper ends thereof. The photographic paper unrolled from the roll R is turned in the opposite direction by being wound around the roller 60 and is drawn out through an aperture 10B formed in the bottom plate 10A and through an aperture 62A formed in a shading plate 62 attached to a surface of the bottom plate 10A under the aperture 10B. A photographic paper drawing-out section is defined between the winding roller 60 and the aperture 62A.

The pressing roller 64 faces the winding roller 60. These rollers serve as pinching rollers which pinch an intermediate portion of the photographic paper P. The pressing roller 64 is axially supported in elongated holes 12A (FIG. 1) formed in the upper case 12 and is urged by elastic bodies (not shown) so that it is normally distanced from the winding roller 60. A support shaft 66 is axially supported on the upper case 12 in parallel with a shaft 64A of the pressing roller 64. One end of the support shaft 66 projects through the case to the outside, and a grip 68 is connected to the support shaft 66 at this end. The support shaft 66 is urged by a compression coil spring 67 in the direction in which it is moved away from the upper case 12. If the grip 68 is moved in the axial direction of the support shaft 66 toward the case 12, a gear 66A of the support shaft 66 and a gear 64B of the shaft 64A mesh with each other and, at the same time, the pressing roller 64 is pressed against the winding roller 60. In this state, the photographic paper P can be driven in the lengthwise direction and unrolled from the roll R or it is drawn back or rewound around the roll R by the operation of rotating the grip in the normal or reverse direction.

Figure 4:
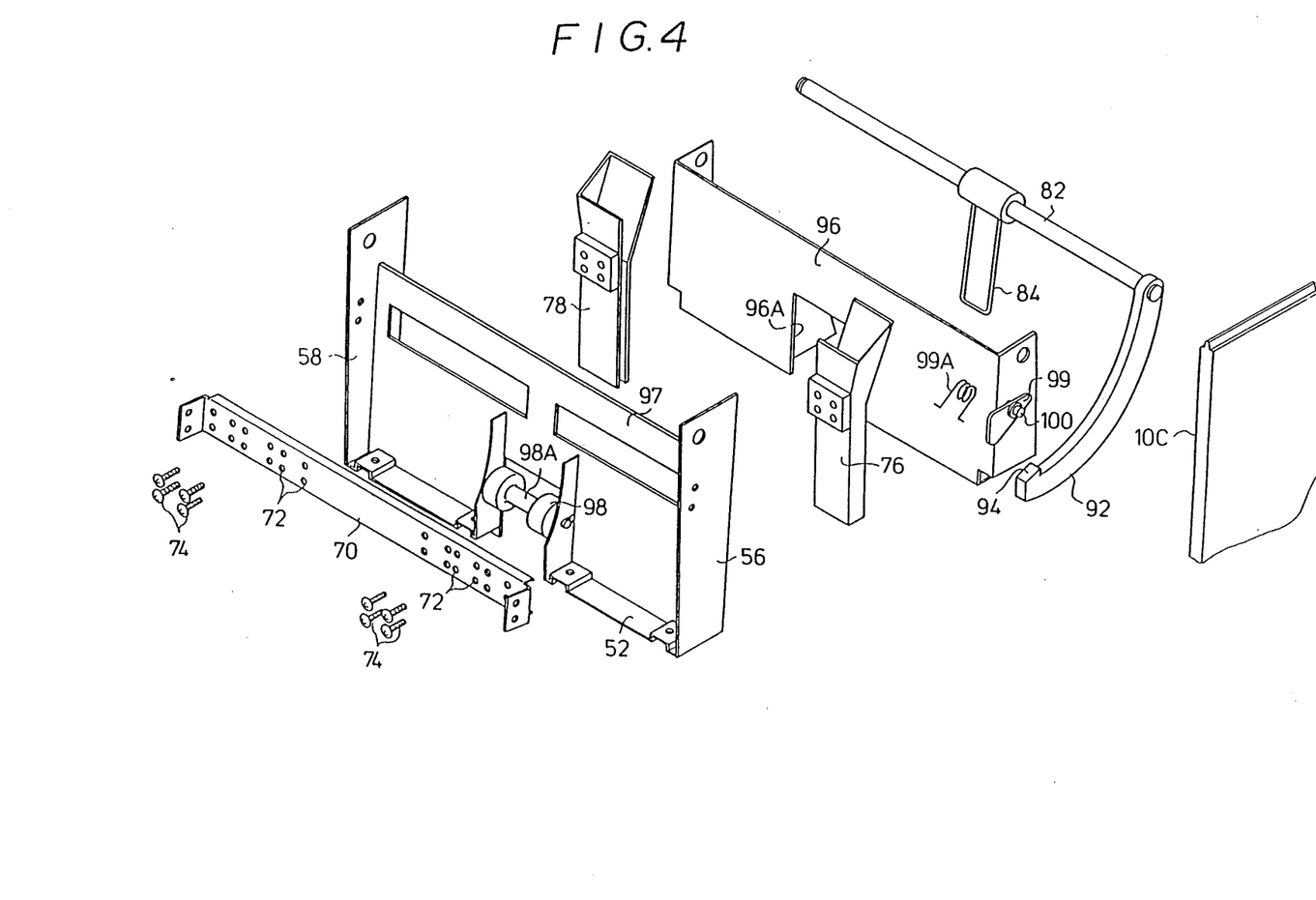
FIG. 4 is an exploded perspective view of a photographic paper guide.

Extreme end portions of an attachment bar 70 shown in FIG. 4 are fixed to the side plates 56 and 58. The attachment bar 74 has a plurality of attachment holes 72 formed in its intermediate portions, and a pair of guide brackets 76 and 78 are fastened by vises 74 passing through the attachment holes 72 and are thereby supported on the attachment bar 70. As shown in FIG. 4, the guide brackets 76 and 78 are formed of bent thin plates in the form of channels which are adapted to receive the opposite sides of the photographic paper P and prevent the photographic paper P from shifting in the transversal direction. Correspondingly, the attachment holes 72 into which the vises 74 are fitted are selected so that the guide brackets 76 and 78 are positioned in accordance with the opposite sides of the photographic paper P. To mount the guide brackets 76 and 78 in this manner, the positions of the attachment holes 72 are determined with respect to the predetermined widths of a plurality of photographic paper P.

A rotary shaft 82 which extend through the side plates 56 and 58 are supported on these plates. One end of a rotary arm 84 is connected to an intermediate portion of the rotary shaft 82. A torsion coil spring 90 shown in FIG. 3 is interposed between the rotary arm 84 and the side plate 56. The torsion coil spring 90 functions in such a manner that the extreme end of the rotary arm 84 is constantly pressed, with a small urging force, against a portion of the photographic paper P linearly extending between the winding roller 60 and the aperture 62A. In consequence, in the case where the photographic paper P is stretched between the winding roller 60 and the aperture 62A, the rotary arm 84 is in a state as indicated by the double-dot-dash line in FIG. 1, or, in the case where the photographic paper P is not stretched through this section, the rotary arm 84 is in a state as indicated in the solid line in FIG. 1.

One end of a connection arm 92 is fixed to one axial end of the rotary shaft 82. A pawl 94 which is formed at the other end of the connection arm 92 faces a ratchet wheel 48 connected to the cylindrical spool 24 supporting the roll of photographic paper, thereby constituting a part of the checking means.

In the case where the photographic paper P exists in the drawing-out section, the connection arm 92 is displaced outward by the photographic paper P to a position indicated by the double-dot-dash line in FIG. 1 while the rotary shaft 82 rotates counterclockwise, thereby moving the pawl 94 away from the ratchet wheel 48. If the leading end of the photographic paper is drawn back into the lower case 10 to a predetermined extent, the connection arm 92 swings clockwise as shown in FIG. 1 by virtue of the urging force of the torsion coil spring 90 so that the pawl 94 engages with the ratchet wheel 48, thereby checking the rotation of the roll R in the winding-up direction (in the clockwise direction as shown in FIG. 1)

In the photographic paper drawing-out section, guide plates 96 and 97 such as those shown in FIG. 4 are disposed on the opposite sides of the path through which the photographic paper P is transferred and which the rotary arm 84 faces and enters. An opening 96A is formed in the guide plate 96 so that the rotary arm 84 can partially enter the path of the photographic paper through this opening. A roller 98 is axially supported on the guide plate 97 so that it faces one side of the photographic paper passing along the guide plate. The extreme end of the rotary arm 84 comes close to a small-diameter portion 98A of the roller 98 when no portion of the photographic paper exists therebetween.

As shown in FIG. 1, a release block 99 is disposed such that it faces one side of the connection arm 92, and a pin 100 projecting from the release block 99 is axially supported on the lower case 10. The release block 99 is supplied with a torque in the counterclockwise direction as shown in FIG. 1 by the urging force of a torsion coil spring 99A, and serves as a release means for moving the pawl 94 away from the ratchet wheel 48 by forcibly swinging the connection arm 92 counterclockwise as shown in FIG. 1. The release block 99 also faces a release projection 101 which is attached to a portion of the upper case 12. The release projection 101 is apart from the release block 99 during an opened state of the magazine in which the upper case 12 has been moved away from the lower case 10 by being rotated clockwise as shown in FIG. 1 about the hinge 14. In this state, the release block 99 is allowed to rotate counterclockwise by the urging force of the torsion coil spring. When, as shown in FIG. 1, the upper case 12 is fitted to the lower case 10, the release projection 101 acts to rotate the release block 99 clockwise around the pin 100 so that the release block 99 is moved to a position at which this block does not contact the connection arm 92.

A guide bracket 102 is attached to the bottom plate 10A. The guide bracket 102 guides the photographic paper P between the aperture 62A and a photographic paper guide 103A of a printing apparatus 103, and supports the shading plate 62 in such a manner that the plate is slidable between the guide bracket 102 and the bottom plate 10A.

The shading plate 62 closes the aperture 10B in a shading manner while being urged by a compression coil spring 106 interposed between the shading plate and the lower case 10. When the lower and upper cases 10 and 12 are mounted on the printing apparatus 103, a top end portion of a block 108 which projects from the printing apparatus 103 comes into contact with a slanted portion 62B of the shading plate 62 and moves the plate against the urging force of the compression coil spring 106 until the aperture 62A coincides with the aperture 10B, thereby enabling the photographic paper to be transferred.

The operation of this embodiment will be described below.

To load the photographic paper P while the magazine is detached from the printing apparatus, the upper case 12 is rotated relative to the lower case 10, thereby opening the magazine. Correspondingly, the release projection 101 is moved away from the release block 99, the release block 99 rotates counterclockwise as viewed in FIG. 1 by the urging force of the torsion coil spring 99A, and the connection arm 92 is thereby allowed to swing counterclockwise as viewed in FIG. 1 about the rotary shaft 82 so that the pawl 94 is moved away from the ratchet wheel 48, thereby enabling the roll R to be rotated.

After the roll R has been removed, a new roll R is fitted around the cylindrical spools 24 and 26 and the support tube 30, and the rotary dial members 20 and 22 are fitted into the recesses 16. The upper case 12 is then brought into close contact with the lower case, and the rotary dial members 20 and 22 are also closed to the recesses 16, thereby shading the interior of the magazine defined inside the lower and upper cases 12. Before the lower and upper cases are closed, the photographic paper P unrolled from the roll R is wound around the winding roller 60 and is turned in the opposite direction, and a leading end portion of the paper is led through the path between the guide plates 96 and 97 and the guide brackets 76 and 78 and is brought into contact with the shading plate 62. At this time, the rotary arm 84 is made to swing counterclockwise as shown in FIG. 1 by the stiffness of the drawn-out portion of the photographic paper and is maintained in this swung position. It is thereby possible for the connection arm 92 to be maintained in the position indicated by the double-dot-dash line in FIG. 1 to prevent any engagement between the pawl 94 and the ratchet wheel 48 while the release projection 101 rotates the release block 99 to the position indicated by the solid line in FIG. 1 as the upper case 12 closes the opening between itself and the lower case 10.

The lower and upper cases 10 and 12 are thereafter loaded in the printing apparatus 103. At this time, the block 108 projecting from the printing apparatus moves the shading plate 62 against the urging force of the compression coil spring 106, thereby opening the aperture 10B. The operator then rotates the grip 68 while pressing the same, and the pressing roller 64 is thereby rotated while, in corporation with the winding roller 60, pinching the photographic paper P, so that the leading end of the photographic paper P is supplied to the printing apparatus through the aperture 10B.

The printing apparatus draws in the photographic paper P in order to perform printing corresponding to a predetermined length of photographic paper. This drawing operation can be performed smoothly while preventing any shift of the photographic paper in the transversal direction since there is no portion causing a large resistance to drawing-out of the photographic paper. If a need to load a magazine accommodating different photographic paper arises, the magazine set in the printing apparatus is removed. In this case, the rotary dial members 20 and 22 are rotated in the reverse direction in order to draw back the photographic paper P into the magazine before it is taken out of the printing apparatus 103.

As the leading end of the photographic paper passes over a position in the vicinity of the extreme end of the rotary arm 84, the rotary arm 84 positively enters the path for the photographic paper P by the urging force of the torsion coil spring 90, as indicated by the solid line in FIG. 1, and the connection arm 92 makes the pawl 94 engage with the ratchet wheel 48, thereby checking the operation of winding up the roll R. The operator is thereby informed of the state in which the photographic paper P has been drawn back into the magazine to the predetermined extent, and the operator stops applying the torque to the rotary dial members 20 and 22.

The operator then takes the magazine out of the printing apparatus. The shading plate 62 is thereby released from the block 108 and is automatically closes the aperture B as it is moved by the urging force of the compression coil spring 106.

Thereafter, the operator can supply the printing apparatus with the desired magazine in which a roll of photographic paper P having different width is accommodated, only by performing the above described operation.

The removed magazine can be set in the printing apparatus with the above-described procedure if it is desired to use the magazine again. At the time of replacement of the magazine, the photographic paper P has been entirely accommodated in the magazine. Therefore there is no possibility of the photographic paper P being fogged, and the whole of the photographic paper P can be used without being wasted. Since an intermediate portion of the photographic paper P is located in the gap between the winding roller 60 and the pressing roller 64, the leading end of the photographic paper P can easily be transferred to the printing apparatus by the rotation of the grip 68 when the magazine is reused.

What is claimed is:

1. A photographic paper magazine for supplying a photographic printing apparatus with photographic paper, comprising:
    a magazine body accommodating a roll of photographic paper and having an outlet aperture through which the photographic paper may be taken out, said magazine being closed and opened;
    photographic paper supporting means axially supported on said magazine body;
    detection means for facing a photographic paper drawing-out section defined between the roll of photographic paper and said outlet aperture, said detection means being moved depending upon whether or not any portion of the photographic paper exists in said photographic paper drawing out section;
    checking means disposed between said detection means and said photographic paper supporting means, and, checking photographic paper winding-up rotations of said photographic paper supporting means when no photographic paper exists in said photographic paper drawing-out section; and
    release means for releasing said checking means from the checking state when said magazine is opened, whereby the roll of photographic paper can be replaced when the magazine body is opened, and said checking means is allowed to operate when said magazine body is closed.

2. A photographic paper magazine according to claim 1, wherein said photographic paper supporting means is constituted by a tubular member inserted into the roll of photographic paper, at least one end of said tubular member projects outside said magazine body and serves as a portion to be operated by the operator.

3. A photographic paper magazine according to claim 2, wherein said magazine body is constituted by an upper case and a lower case between which said photographic paper supporting means is axially supported.

4. A photographic paper magazine according to claim 3, wherein said upper and lower cases of said magazine have recesses for accommodating said photographic paper supporting means.

5. A photographic paper magazine according to claim 1, wherein said checking means is interposed between said photographic paper supporting means and said detection means, said checking means engages with said support means to check the rotation thereof when no photographic paper exists in said drawing-out section.

6. A photographic paper magazine according to claim 1, wherein said checking means has a ratchet gear fixed to said photographic paper supporting means, and a connection arm which is connected to said detection means and is engageable with said ratchet gear.

7. A photographic paper magazine according to claim 6, wherein said connection arm and said detection means are formed integrally with each other and are axially supported on said magazine.

8. A photographic paper magazine according to claim 6, wherein said checking means is designed to release said connection arm from said ratchet gear when said magazine is opened.

9. A photographic paper magazine according to claim 8, further comprising an elastic body for applying an urging force to said checking means in a direction such that said connection arm is released from said ratchet gear, said connection arm being swung against the urging force of said elastic body when said magazine is closed.

10. A photographic paper magazine according to claim 9, wherein both said connection arm and said checking means are axially supported on one of said cases forming said magazine body, and the other one of said cases drives said connections arm against said urging force when moved to said one of said cases to close said magazine.

11. A photographic paper magazine according to claim 1, further comprising a pressing roller provided in said drawing-out section apart from the photographic paper, said pressing roller being brought into contact with the photographic paper by the operation of the operator so as to apply a drawing-out drive force thereto.

12. A photographic paper magazine according to claim 11, further comprising a winding roller provided in said drawing-out section and around which the photographic paper being wound, and the photographic paper being pinched between said pressing roller and said winding roller.

13. A photographic paper magazine for supplying a photographic printing apparatus with photographic paper stored in a roll, comprising:
a magazine body having upper and lower cases releasably fitted to each other to accommodate for storage within said body a roll of photographic paper, and an outlet aperture for taking out of said magazine the photographic paper being stored therein;
a photographic paper supporting shaft sized to be inserted into the roll of photographic paper and to be axially supported by said magazine body, said shaft being rotatable in a winding-up direction;
checking means for checking winding-up rotation of said photographic paper supporting shaft when no photographic paper exists in a path through which the photographic paper is drawn out from the roll; and
release means operable in conjunction with said checking means for allowing said photographic paper supporting shaft to be rotated when said upper and lower cases are released from each other.

14. A photographic paper magazine according to claim 13, wherein said support shaft is axially supported between said upper and lower cases, at least one end of said support shaft projects outside said cases and serves as as a portion to be operated by the operator.

15. A photographic paper magazine according to claim 13, wherein said checking means allows said support shaft to be rotated when disengaged from engagement means.

16. A photographic paper magazine according to claim 15, wherein said release means disengages said engagement means when said magazine is closed.

17. A photographic paper magazine according to claim 13, wherein said checking means comprises a ratchet wheel fixed to said support shaft, and a lever being engageable with said ratchet wheel.

18. A photographic paper magazine according to claim 17, wherein said lever and a release block are axially supported on said lower case, and said release block is urged by a spring in a direction such that said lever is moved away from said ratchet wheel, said release block being moved away from said lever when said upper and lower cases are fitted to each other to close said magazine.

19. A photographic paper magazine according to claim 18, wherein said upper case has a portion which is brought into abutment with said release block.

20. A photographic paper magazine for supplying a photographic printing apparatus with photographic paper, comprising:
a magazine body having upper and lower cases connected to each other by a hinge, said upper and lower cases being fitted to each other so as to shade the interior of said magazine while accommodating a roll of photographic paper;
a support shaft inserted into the roll of photographic paper and axially supported on said magazine, at least one end of said support shaft projecting outside said magazine and serving as a portion to which a winding-up force is applied by the operator;
a detection arm axially supported on said lower case and capable of contacting the photographic paper unrolled from the roll;
a checking arm driven by said detection arm;
a ratchet wheel fixed to said support shaft, said ratchet wheel engaging with said checking arm when there being no photographic paper unrolled from the roll;
release means provided in said lower case, said release means being distanced from said checking arm when said upper and lower case being fitted to close said magazine, said release means moving said checking arm away from said ratchet wheel with an urging force when said upper and lower cased being released from each other to open said magazine; and
a roller normally distanced from the photographic paper, said roller contacting said photographic paper so as to apply a drawing-out force thereto when the photographic paper being required to be drawn out.

* * * * *